(12) United States Patent
Lin et al.

(10) Patent No.: US 7,061,752 B1
(45) Date of Patent: Jun. 13, 2006

(54) FOLDABLE ELECTRONIC DEVICE

(75) Inventors: Chien-Ta Lin, Nan-Tou Hsien (TW);
Chien-Ming Hu, Tainan Hsien (TW)

(73) Assignee: Universal Scientific Industrial Co., Ltd., Nan-Tou Hsien (TW)

( * ) Notice: Subject to any disclaimer, the term of this patent is extended or adjusted under 35 U.S.C. 154(b) by 1 day.

(21) Appl. No.: 11/041,993

(22) Filed: Jan. 26, 2005

(51) Int. Cl.
*H05K 5/00* (2006.01)

(52) U.S. Cl. ...................................... 361/680; 361/683
(58) Field of Classification Search ................ 361/680, 361/683; 400/679, 680, 681, 682
See application file for complete search history.

(56) References Cited

U.S. PATENT DOCUMENTS

| | | | |
|---|---|---|---|
| 6,552,281 B1 * | 4/2003 | Katakami et al. ............ 200/5 A |
| 6,625,011 B1 * | 9/2003 | Hyun ........................... 361/680 |
| 6,704,193 B1 * | 3/2004 | Vathulya ...................... 361/681 |
| 6,793,421 B1 * | 9/2004 | Baldwin et al. ............. 400/488 |
| 6,894,626 B1 * | 5/2005 | Olodort et al. ................ 341/22 |
| 6,965,076 B1 * | 11/2005 | Wu ............................ 174/52.2 |
| 6,967,831 B1 * | 11/2005 | Chuang ....................... 361/680 |

* cited by examiner

*Primary Examiner*—Hung V. Ngo
(74) *Attorney, Agent, or Firm*—Berenato, White & Stavish

(57) ABSTRACT

A foldable electronic device includes first and second members interconnected pivotally by a coupling unit. The first and second members have first and second positioning portions, respectively. The coupling unit includes a coupling link, a slide link and a biasing member. The coupling link has a first end portion retained rotatably at the first positioning portion, and an opposite second end portion extending in a longitudinal direction. The slide link is retained slidably on the coupling link for sliding along the longitudinal direction, and is retained rotatably at the second positioning portion. The biasing member pulls the slide link toward the first member. The coupling unit permits movement of the second member in sequence from an unfolded position, a first intermediate position, a second intermediate position, and to a folded position relative to the first member.

12 Claims, 17 Drawing Sheets

US 7,061,752 B1

FOLDABLE ELECTRONIC DEVICE

BACKGROUND OF THE INVENTION

1. Field of the Invention

The invention relates to an electronic device, more particularly to a foldable electronic device.

2. Description of the Related Art

Aside from functionality, aesthetic appeal and compact size are also important factors considered in the design of modern electronic devices.

FIG. 1 illustrates a foldable keyboard that includes a first keyboard member 1, a second keyboard member 2, a pair of pivot seats 3, each of which is mounted on a respective long edge of the first keyboard member 1, and a pair of links 4, each of which interconnects pivotally the second keyboard member 2 and a respective one of the pivot seats 3. By virtue of the pivot seats 3 and the links 4, the first and second keyboard members 1, 2 can be folded and unfolded relative to each other, thereby facilitating storage, packaging and transport. However, the pivot seats 3 and the links 4 project from the top surface of the keyboard, and use of the pivot seats 3 and the links 4 results in a clearance or a discontinuity between the first and second keyboard members 1, 2, which have an adverse affect on the appearance of the keyboard.

SUMMARY OF THE INVENTION

Therefore, the object of the present invention is to provide a foldable electronic device that can overcome at least one of the aforesaid drawbacks, i.e., the aforesaid discontinuity and poor appearance associated with the prior art.

Accordingly, the foldable electronic device of this invention comprises a first member, a second member, and a coupling unit.

The first member has a first top side with an edge portion, and a first positioning portion that extends along a first axis and that is disposed at the edge portion of the first top side.

The second member has a second top side with an edge portion, and a second positioning portion that extends along a second axis parallel to the first axis and that is disposed at the edge portion of the second top side.

The coupling unit interconnects pivotally the first and second members, and includes a coupling link, a slide link and a biasing member.

The coupling link has a first end portion retained rotatably at the first positioning portion, and a second end portion opposite to the first end portion in a longitudinal direction transverse to the first and second axes.

The slide link extends along the longitudinal direction, is disposed beside the coupling link, is retained slidably on the coupling link for sliding a long the longitudinal direction, and is retained rotatably at the second positioning portion.

The biasing member pulls the slide link toward the first member.

The coupling unit permits movement of the second member in sequence from an unfolded position, a first intermediate position, a second intermediate position, and to a folded position relative to the first member.

The first and second top sides of the first and second members face upwardly when the second member is in the unfolded position.

The second member is operable to pull the slide link away from the first member against action of the biasing member when moving the second member from the unfolded position to the first intermediate position, where a clearance is formed between the edge portions of the first and second top sides of the first and second members.

The second member is further operable to cause the coupling link to pivot about the first axis when moving the second member from the first intermediate position to the second intermediate position.

The second member is further operable to cause the slide link to pivot about the second axis when moving the second member from the second intermediate position to the folded position, where the first and second top sides of the first and second members face each other.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
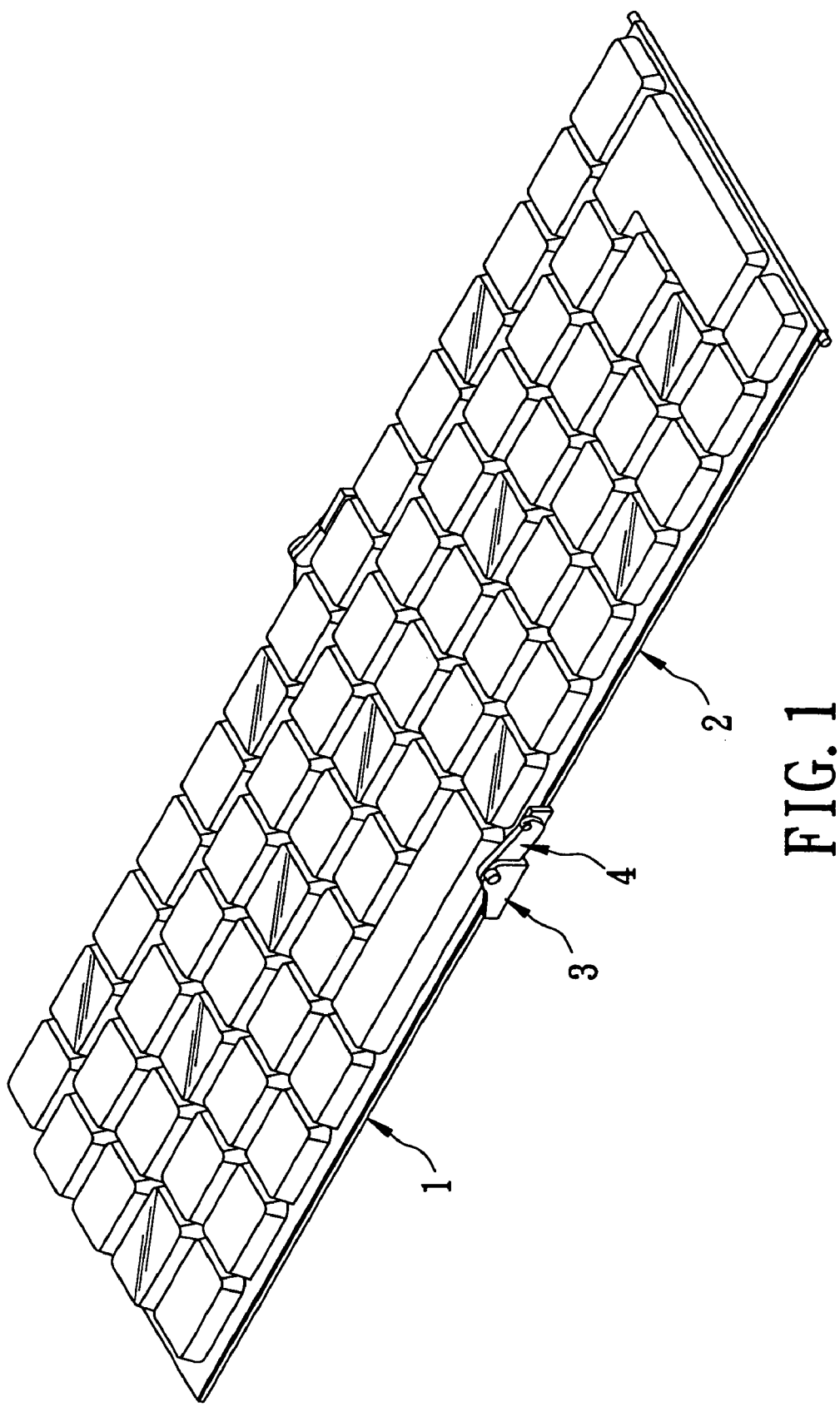
FIG. 1 is an assembled perspective view of a conventional foldable keyboard.

Before the present invention is described in greater detail with reference to the accompanying preferred embodiments, it should be noted here in that like elements are denoted by the same reference numerals throughout the disclosure.

Referring to FIGS. 2 to 5, the foldable electronic device 3 according to the present invention is shown to be embodied in a docking station that serves as an interface between a notebook computer and at least one computer peripheral device, such as a printer, a storage device, etc. The foldable electronic device 3 comprises a first member 10, a second member 20, a pair of connecting units 30 (only one is shown), and a pair of coupling units 70 (only one is shown).

The first member 10 is a host part of the docking station in this embodiment, and has a first top side 11 with an edge portion 12, and a pair of first positioning portions 13 (only one is shown) that extend along a first axis (L1), that are disposed at the edge portion 12 of the first top side 11, and that are spaced apart from each other along the first axis (L1). In this embodiment, each first positioning portion 13 is formed with a hexagonal blind hole.

The second member 20 is an extension part of the docking station in this embodiment, and provides a surface for positioning the notebook computer when the latter is placed on the docking station. The second member 20 has a second top side 21 with an edge portion 22, and a pair of second positioning portions 23 (only one is shown) that extend along a second axis (L2) parallel to the first axis (L1), that are disposed at the edge portion 22 of the second top side 21, and that are spaced apart from each other along the second axis (L2). In this embodiment, each second positioning portion 23 is formed with a circular blind hole.

Each connecting unit 30 includes an anchor member 31, a limit member 32, and a pivot member 33. In this embodiment, the anchor member 31 is hexagonal in shape, and is mounted non-rotatably in the hexagonal blind hole in a respective one of the first positioning portions 13. The limit member 32 is fixed on one side of the anchor member 31, and is formed with radial outward first and second stop projections 321, 322 that are angularly spaced apart from each other. The first and second stop projections 321, 322 form an angle not greater than 100 degrees therebetween. In this embodiment, the angle formed between the first and second stop projections 321, 322 is 97 degrees. The pivot member 33 extends along the first axis (L1) and is connected rotatably to the anchor member 31. The pivot member 33 includes an axle segment 331 connected rotatably to the anchor member 31, a non-circular coupling segment 332 connected to the axle segment 331, and a cylindrical segment 333 extending from the coupling segment 332. The cylindrical segment 333 has a first diameter-reduced part 45 adjacent to the coupling segment 332, and a second diameter-reduced part 334 spaced apart from the first diameter-reduced part 45 along the first axis (L1).

The coupling units 70 interconnect pivotally the first and second members 10, 20. Each coupling unit 70 includes a coupling link 40, a slide link 50, and a biasing member 60.

The coupling link 40 has a first end portion 41 retained rotatably at a corresponding one of the first positioning portions 13, and a second end portion 42 opposite to the first end portion 41 in a longitudinal direction (X) transverse to the first and second axes (L1, L2). The first end portion 41 is connected co-rotatably to the pivot member 33. In this embodiment, the first end portion 41 is formed with an engaging hole 43 for engaging non-rotatably the coupling segment 332 of the pivot member 33. The first end portion 41 is further formed with a limit block 44 that is disposed between the first and second stop projections 321, 322. The second end portion 42 of the coupling link 40 is formed with a slide coupler 46 that extends parallel to the second axis (L2).

The slide link 50 extends along the longitudinal direction (X), is disposed beside the corresponding coupling link 40, is retained slidably on the corresponding coupling link 40 for sliding along the longitudinal direction (X), and is retained rotatably at a corresponding one of the second positioning portions 23. In this embodiment, the slide link 50 has a first link portion 51 formed with an elongate first slot 53, and a second link portion 52 opposite to the first link portion 51 in the longitudinal direction (X) and formed with an elongate second slot 54. The first diameter-reduced part 45 of the cylindrical segment 333 of the pivot member 33 is movably disposed in the first slot 53. The slide coupler 46 of the coupling link 40 is movably disposed in the second slot 54. The first slot 53 has opposite first and second slot ends 531, 532. The second slot 54 also has opposite first and second slot ends 541, 542. The slide link 50 is further formed with a pivot shaft 55 that engages rotatably the circular blind hole in the corresponding second positioning portion 23.

In this embodiment, the biasing member 60 is an extension spring having opposite ends 61, 62 connected respectively to the second diameter-reduced part 334 of the cylindrical segment 333 of the pivot member 33 of a corresponding coupling unit 30, and the pivot shaft 55 of the corresponding slide link 50, thereby pulling the corresponding slide link 50 toward the first member 10.

The coupling units 70 permit movement of the second member 20 in sequence from an unfolded position (see FIGS. 3 to 5), a first intermediate position (see FIGS. 6 and 7), a second intermediate position (see FIGS. 8 and 9), and to a folded position (see FIGS. 10 and 11) relative to the first member 10.

Figure 3:
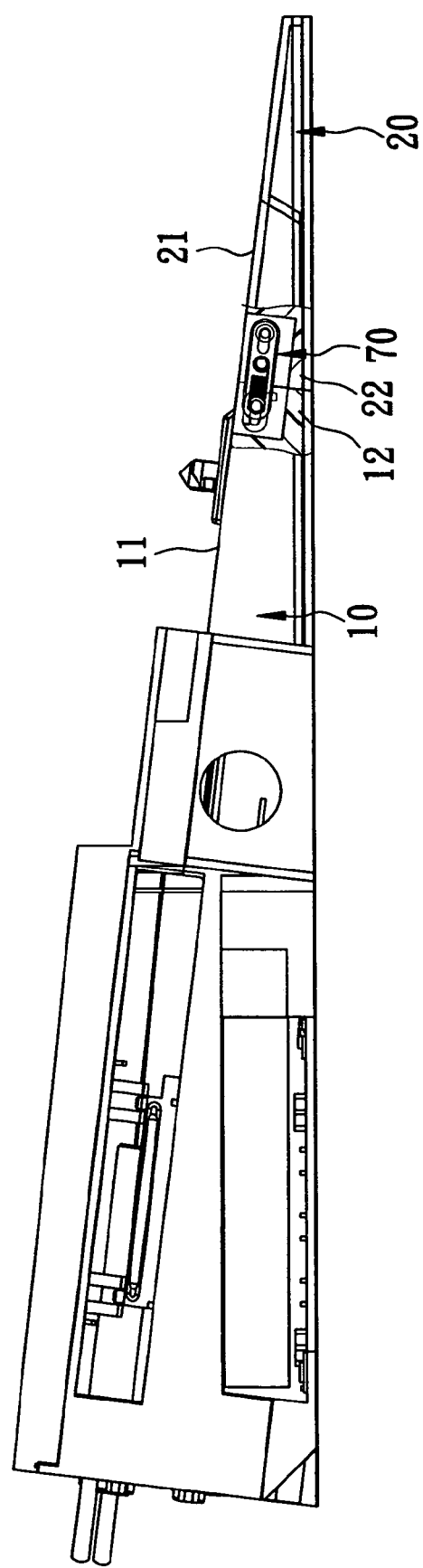
FIG. 3 is an assembled schematic side view of the first preferred embodiment when a second member thereof is disposed in an unfolded position relative to a first member.
Figure 4:
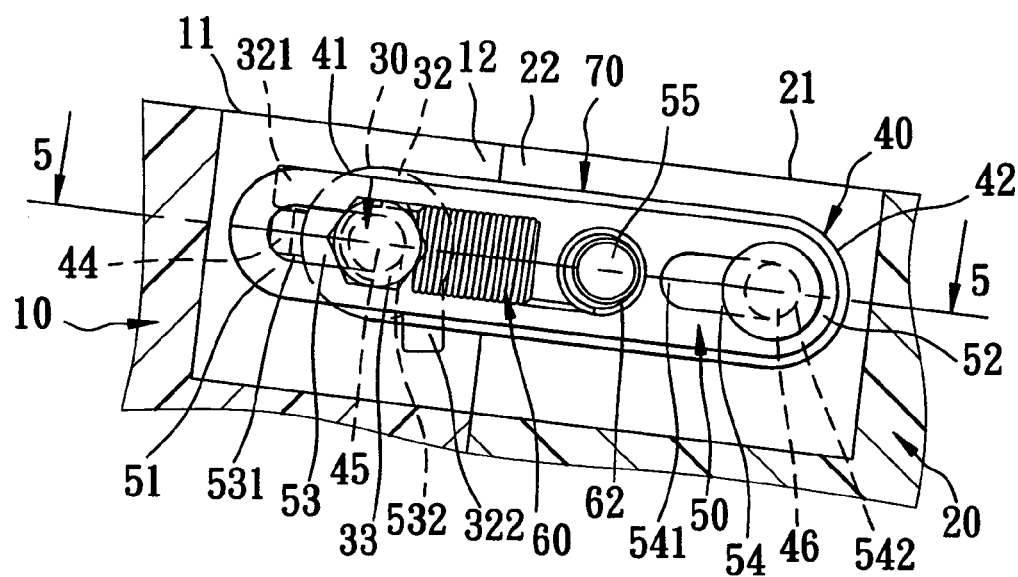
FIG. 4 is an enlarged schematic side view to illustrate a coupling unit of the first preferred embodiment.
Figure 5:
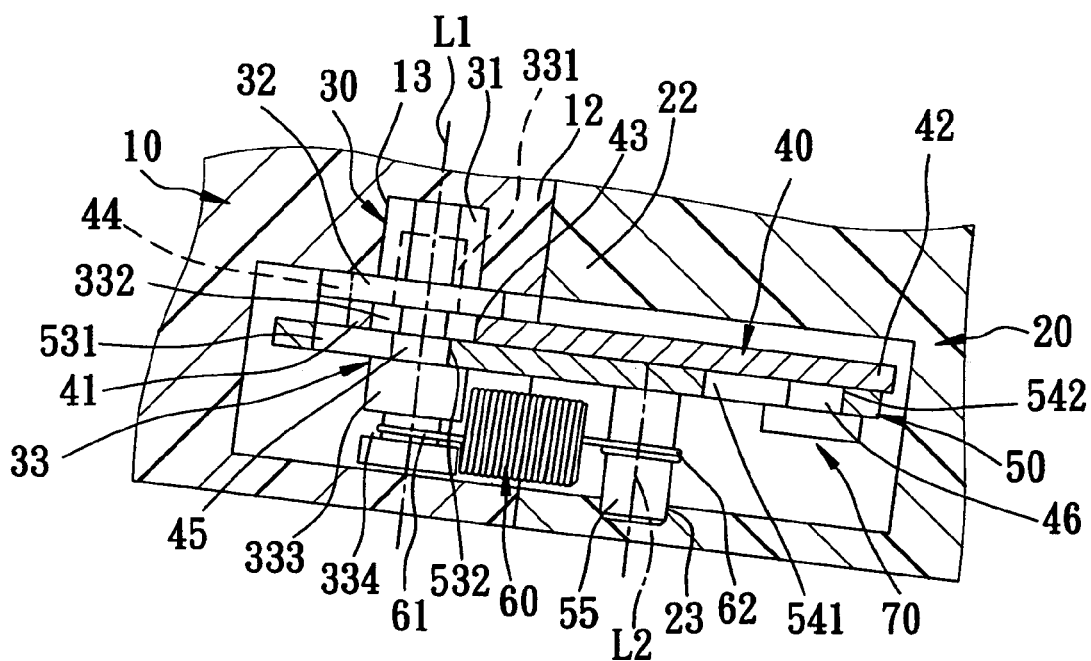
FIG. 5 is a cross-sectional view of the first preferred embodiment, taken along line 5—5 of FIG. 4.

As shown in FIGS. 3 to 5, when the second member 20 is in the unfolded position, the first and second top sides 11, 21 of the first and second members 10, 20 face upwardly, and the edge portions 12, 22 of the first and second members 10, 20 abut against each other. No clearance is formed between the first and second edge portions 12, 22 at this time. The first diameter-reduced part 45 of the cylindrical segment 333 of the pivot member 33 of each connecting unit 30 and the slide coupler 46 of each coupling link 40 are disposed at the second end 532, 542 of the respective one of the first and second slots 53, 54 of the corresponding slide link 50. In addition, the limit block 44 on each coupling link 40 is disposed proximate to and abuts against the first stop projection 321 on the limit member 32 of the corresponding connecting unit 30 to enhance positioning of the second member 20 in the unfolded position relative to the first member 10.

Figure 6:
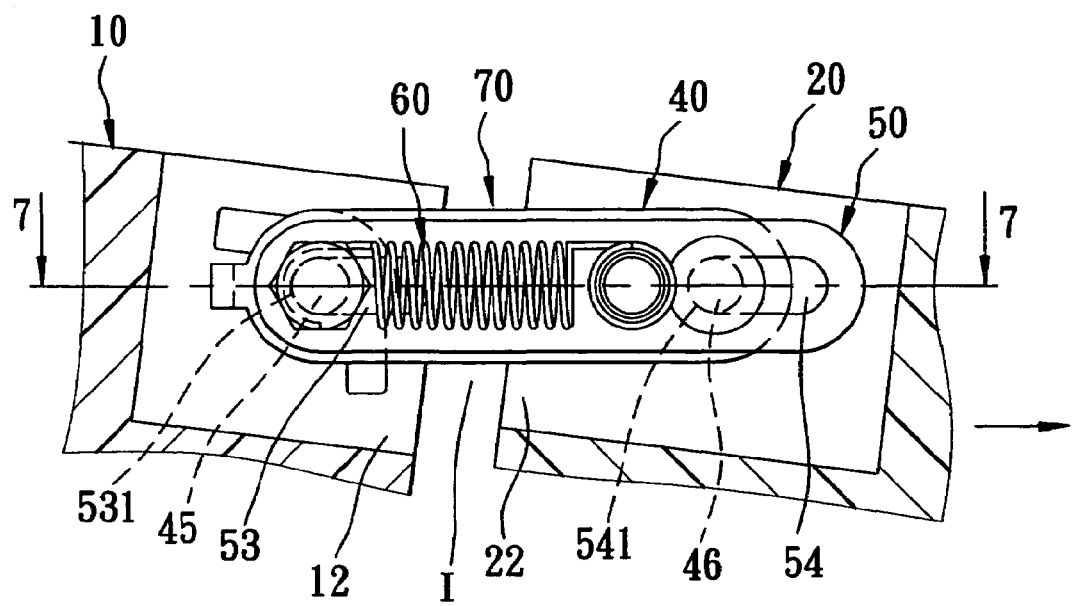
FIG. 6 is an enlarged schematic side view of the coupling unit, illustrating movement of the second member to a first intermediate position relative to the first member.
Figure 7:
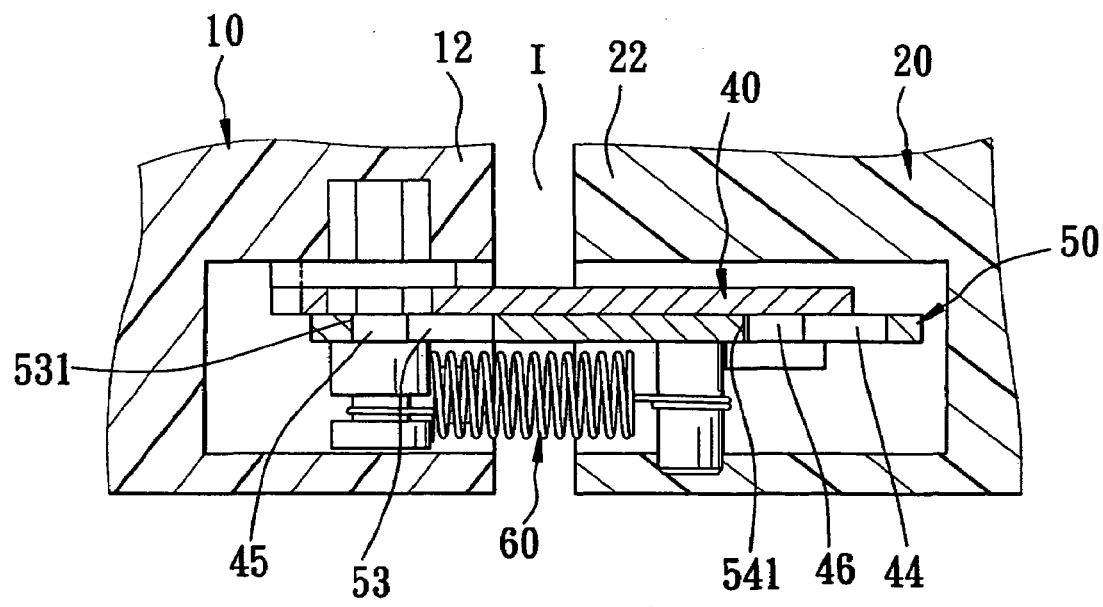
FIG. 7 is a cross-sectional view of the first preferred embodiment, taken along line 7—7 of FIG. 6.

As shown in FIGS. 6 and 7, the second member 20 is operable to pull the slide links 50 away from the first member 10 against action of the biasing members 60, thereby disposing the first diameter-reduced part 45 of the cylindrical segment 333 of the pivot member 33 of each connecting unit 30 and the slide coupler 46 of each coupling link 40 at the first end 531, 541 of the respective one of the first and second slots 53, 54 of the corresponding slide link 50, when moving the second member 20 from the unfolded position to the first intermediate position. A clearance (I) is formed between the edge portions 12, 22 of the first and second members 10, 20 when the second member 20 is in the first intermediate position.

Figure 8:
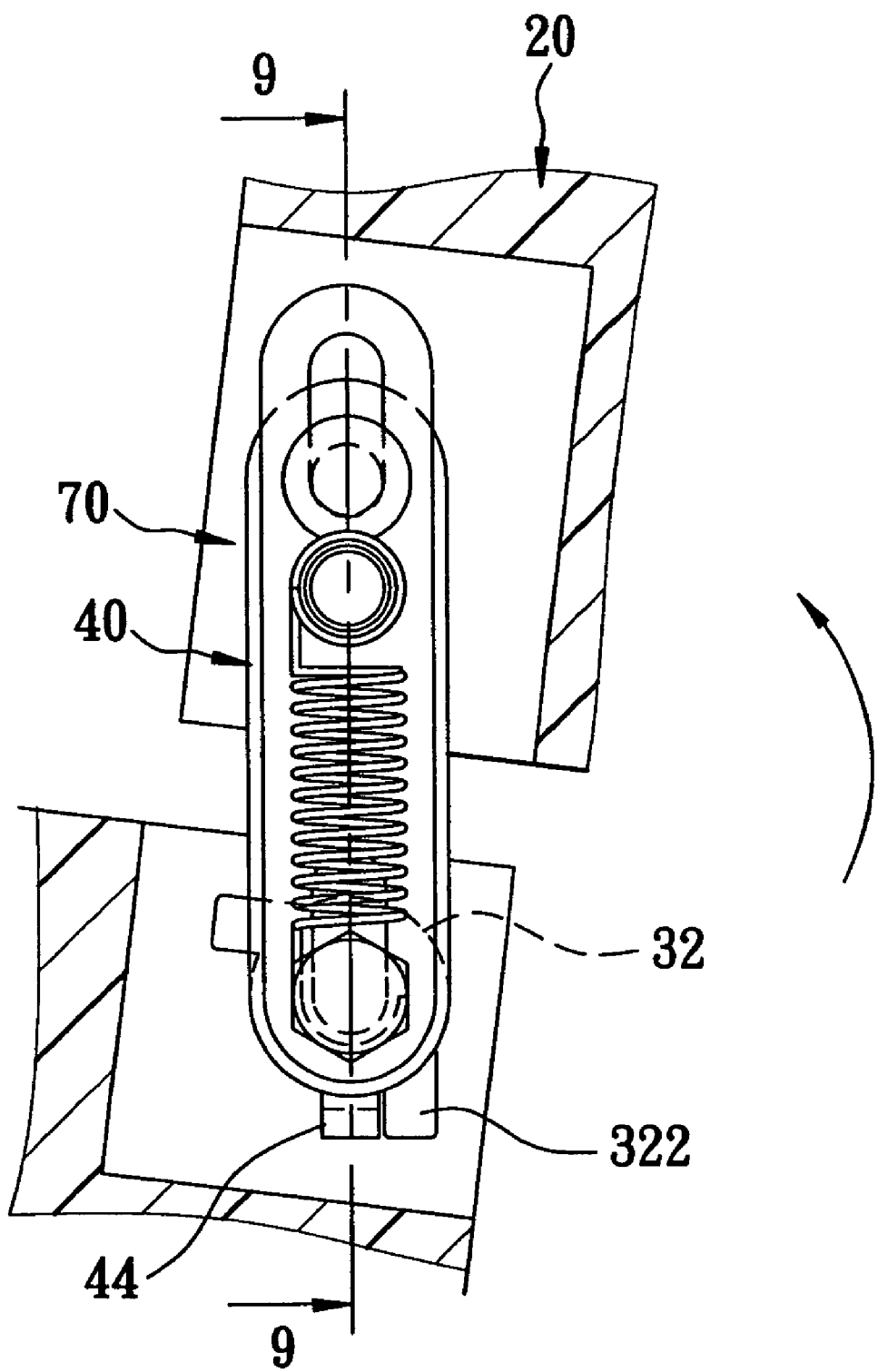
FIG. 8 is an enlarged schematic side view of the coupling unit, illustrating movement of the second member to a second intermediate position relative to the first member.
Figure 9:
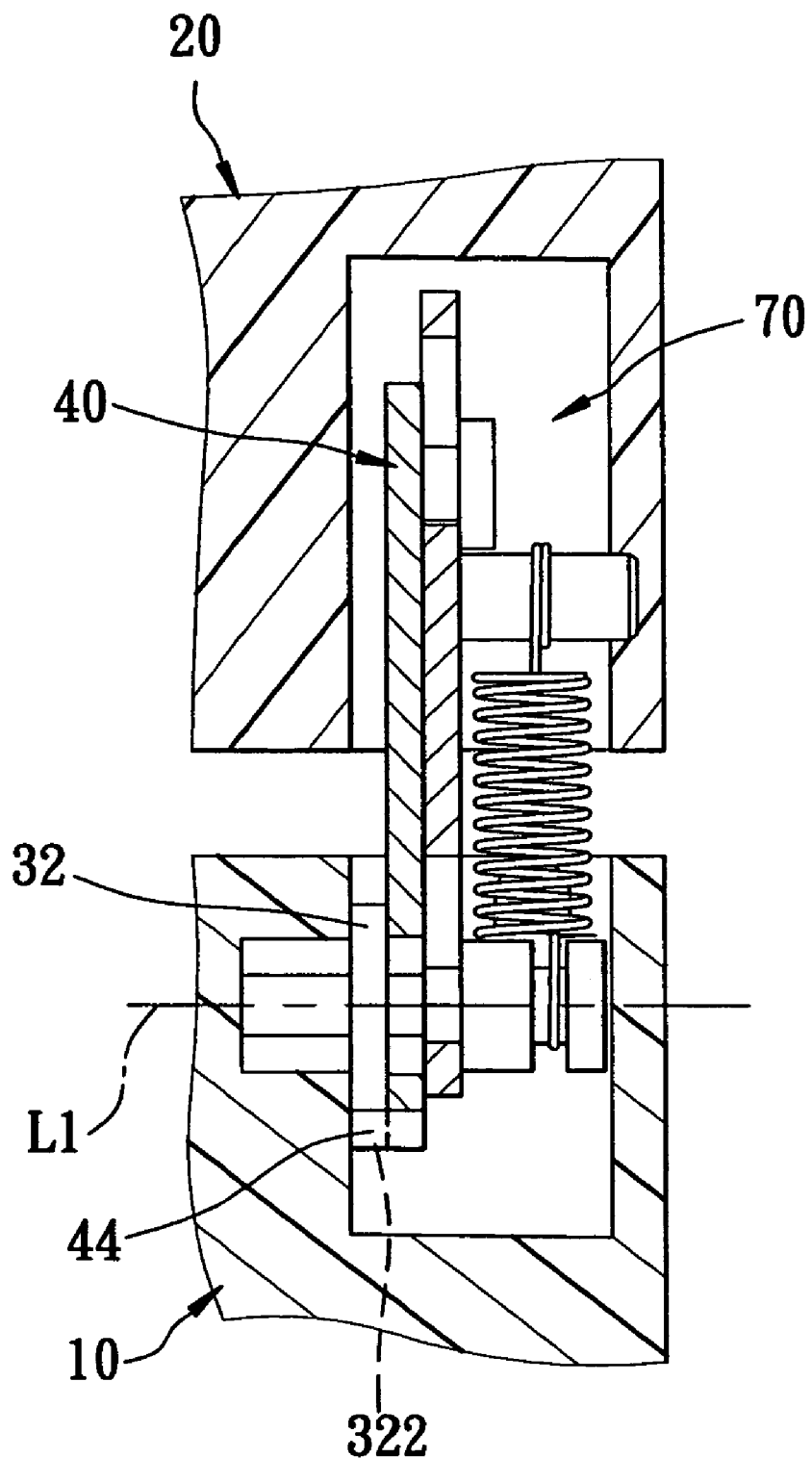
FIG. 9 is a cross-sectional view of the first preferred embodiment, taken along line 9—9 of FIG. 8.

As shown in FIGS. 8 and 9, the second member 20 is further operable to cause the coupling links 40 to pivot about the first axis (L1) when moving the second member 20 from the first intermediate position to the second intermediate position, where the second member 20 is generally upright. The limit block 44 on each coupling link 40 is disposed proximate to and abuts against the second stop projection 322 on the limit member 32 of the corresponding connecting unit 30 to enhance positioning of the second member 20 in the second intermediate position relative to the first member 10.

Figure 2:
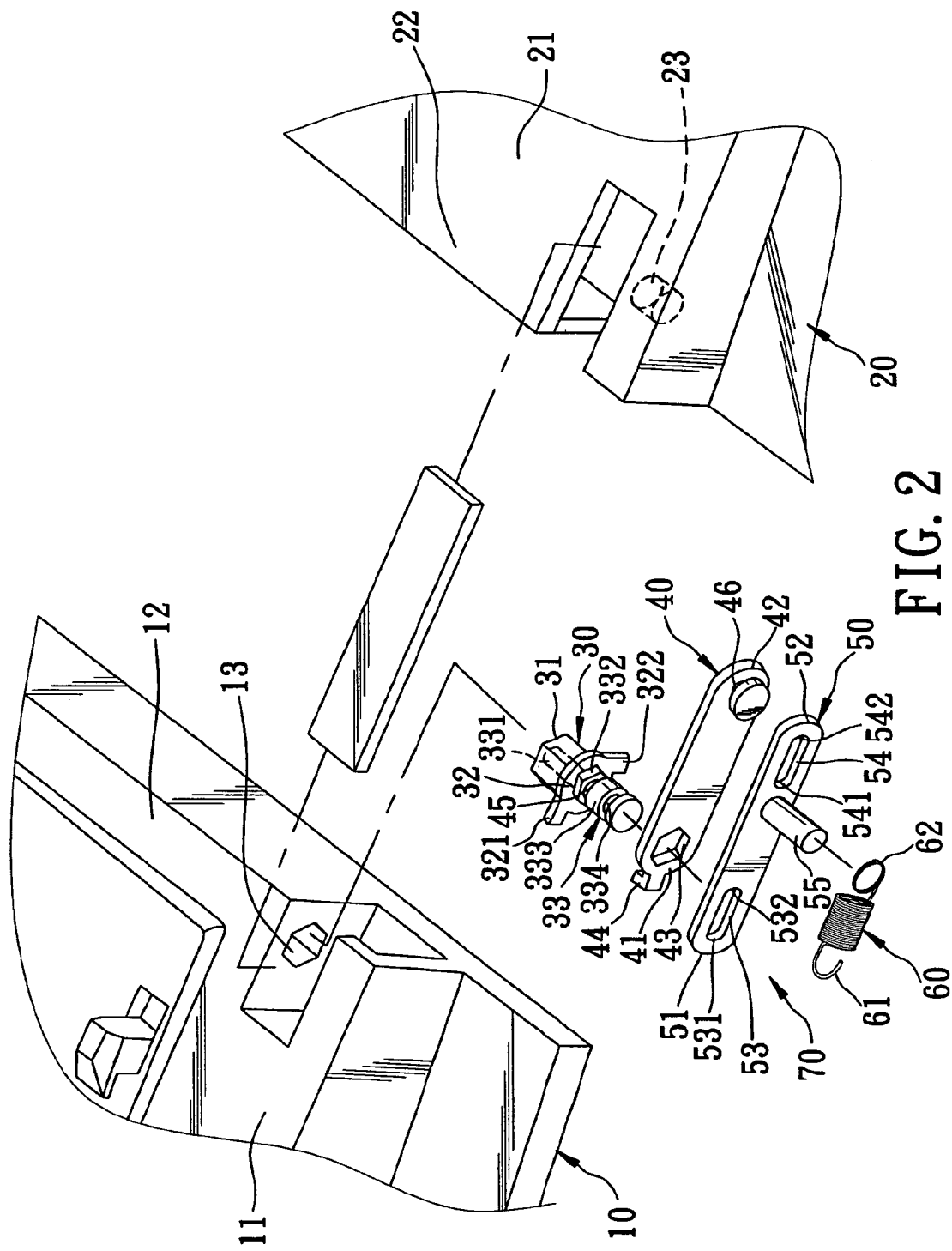
FIG. 2 is a fragmentary exploded perspective view of the first preferred embodiment of a foldable electronic device according to the present invention.
Figure 10:
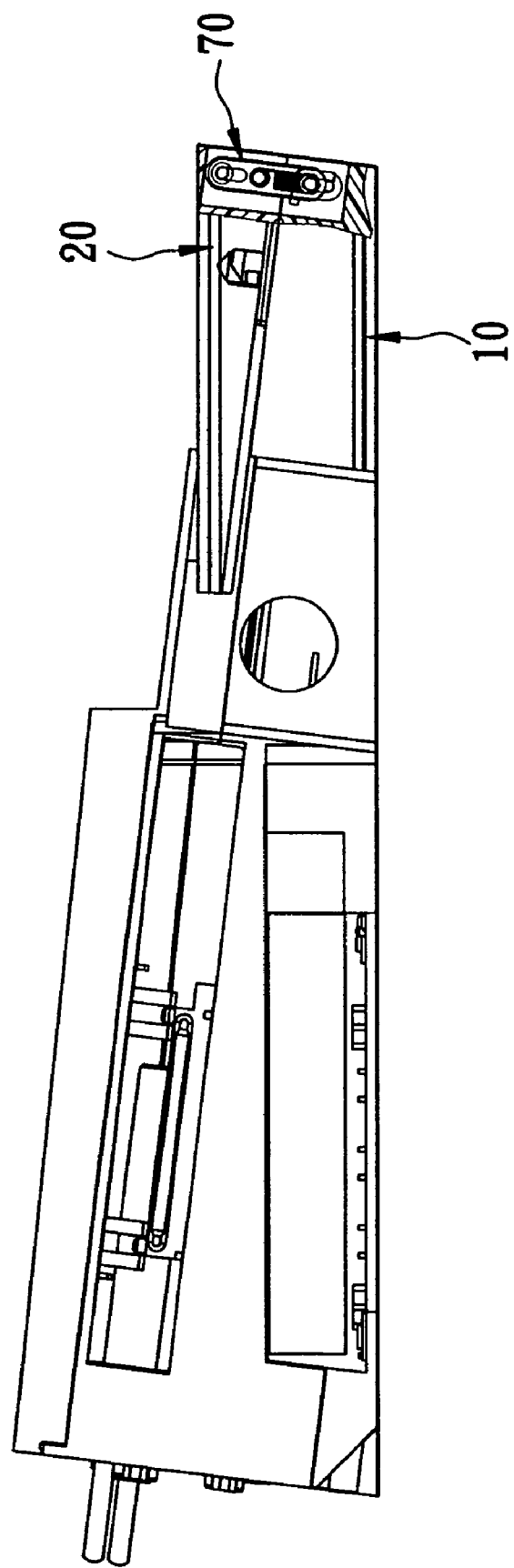
FIG. 10 is a schematic side view of the first preferred embodiment when the second member is disposed in a folded position relative to the first member.
Figure 11:
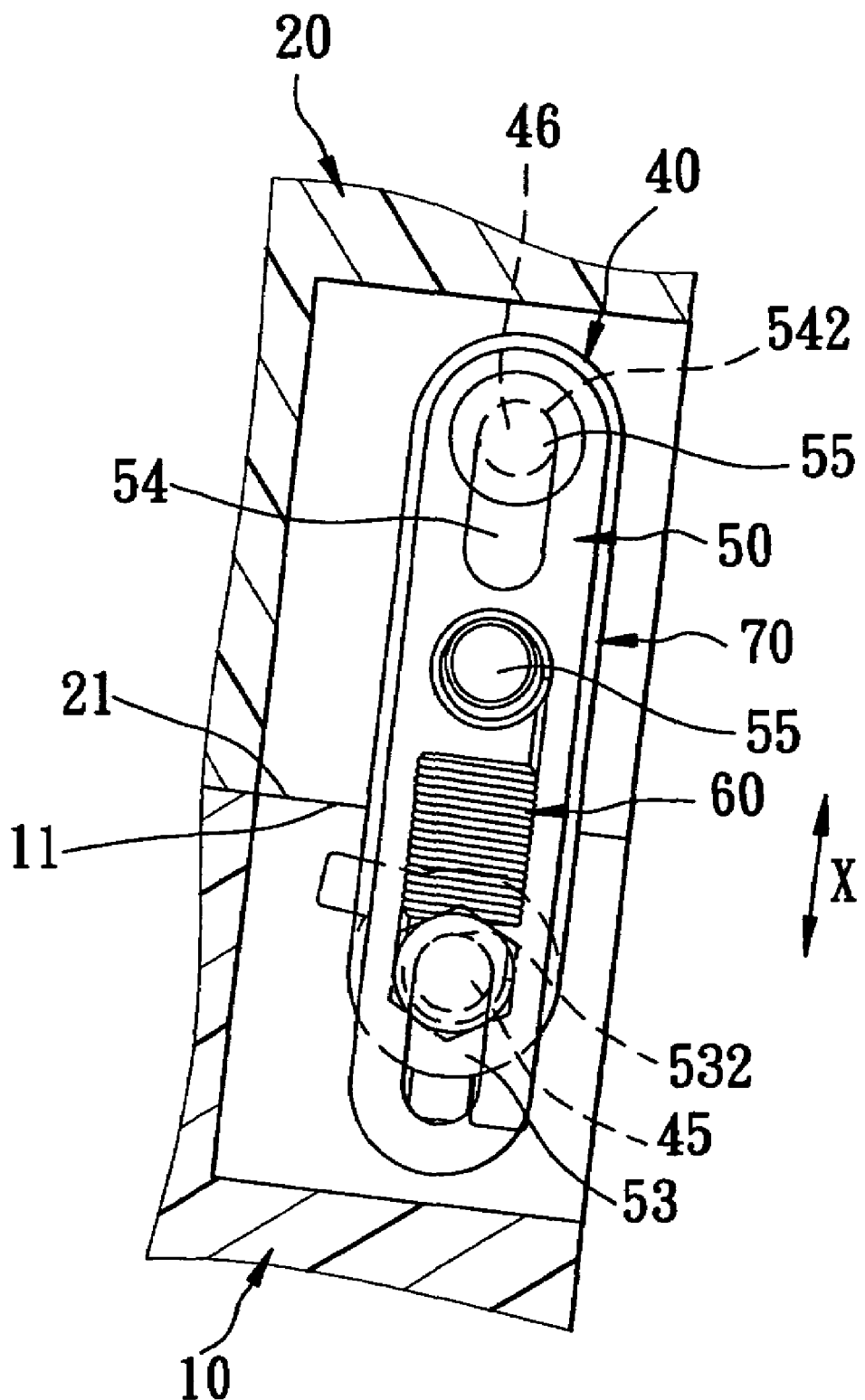
FIG. 11 is an enlarged schematic side view of the coupling unit when the second member is in the folded position.

As shown in FIGS. 10 and 11, in combination with FIG. 2, the second member 20 is further operable to cause the slide links 50 to pivot about the second axis (L2) when moving the second member 20 from the second intermediate position to the folded position, where the first and second top sides 11, 21 of the first and second members 10, 20 face and abut against each other. By virtue of the biasing action of the biasing members 60, the first diameter-reduced part 45 of the cylindrical segment 333 of the pivot member 33 of each connecting unit 30 and the slide coupler 46 of each coupling link 40 are restored to the second end 532, 542 of the respective one of the first and second slots 53, 54 of the corresponding slide link 50. No gap is formed between the first and second top sides 11, 21 of the first and second members 10, 20 at this time.

The second member 20 is moved from the folded position back to the unfolded position relative to the first member 10 by performing the above operations in a reversed order.

Figure 12:
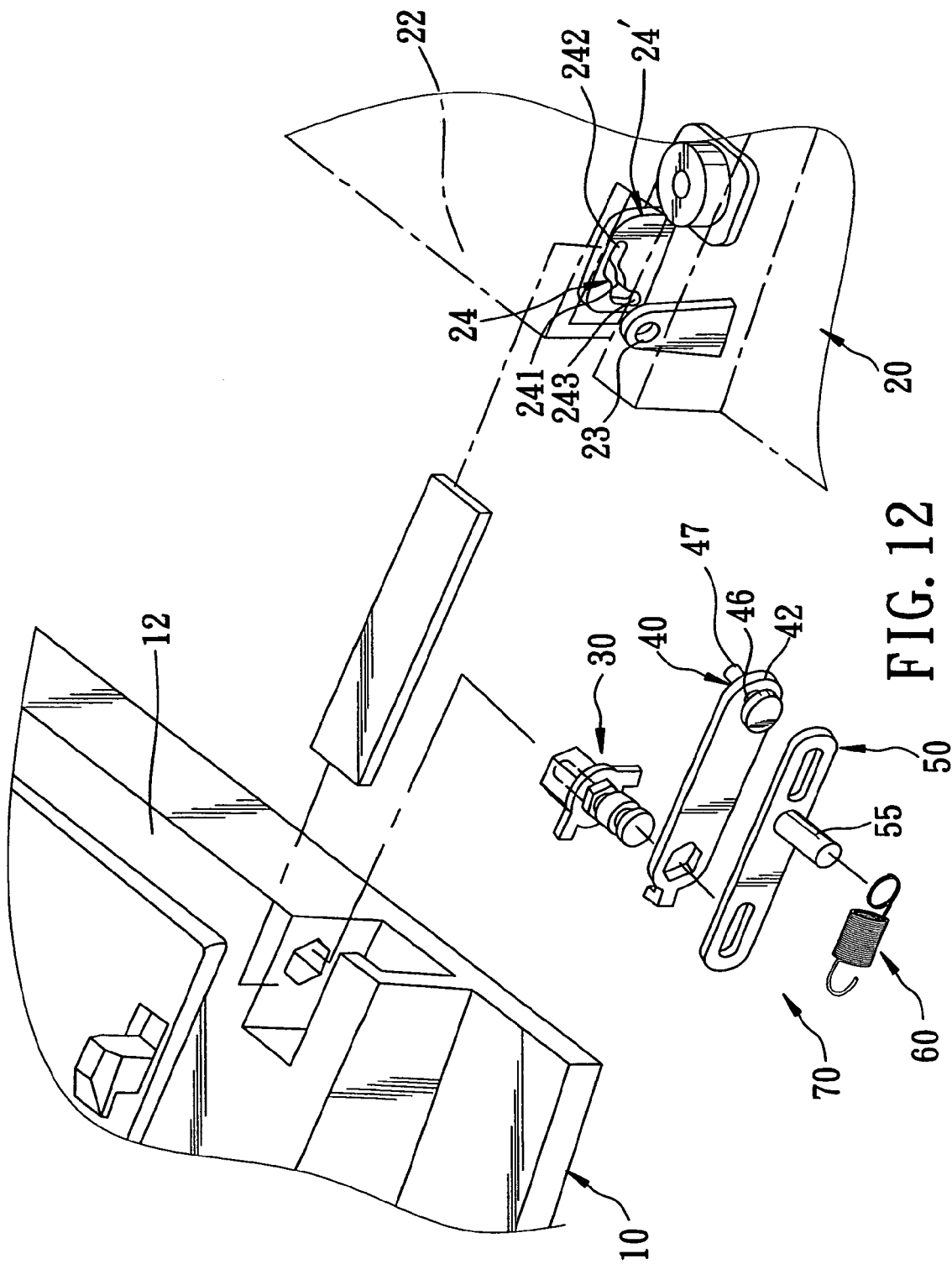
FIG. 12 is a fragmentary exploded perspective view of the second preferred embodiment of a foldable electronic device according to the present invention.
Figure 13:
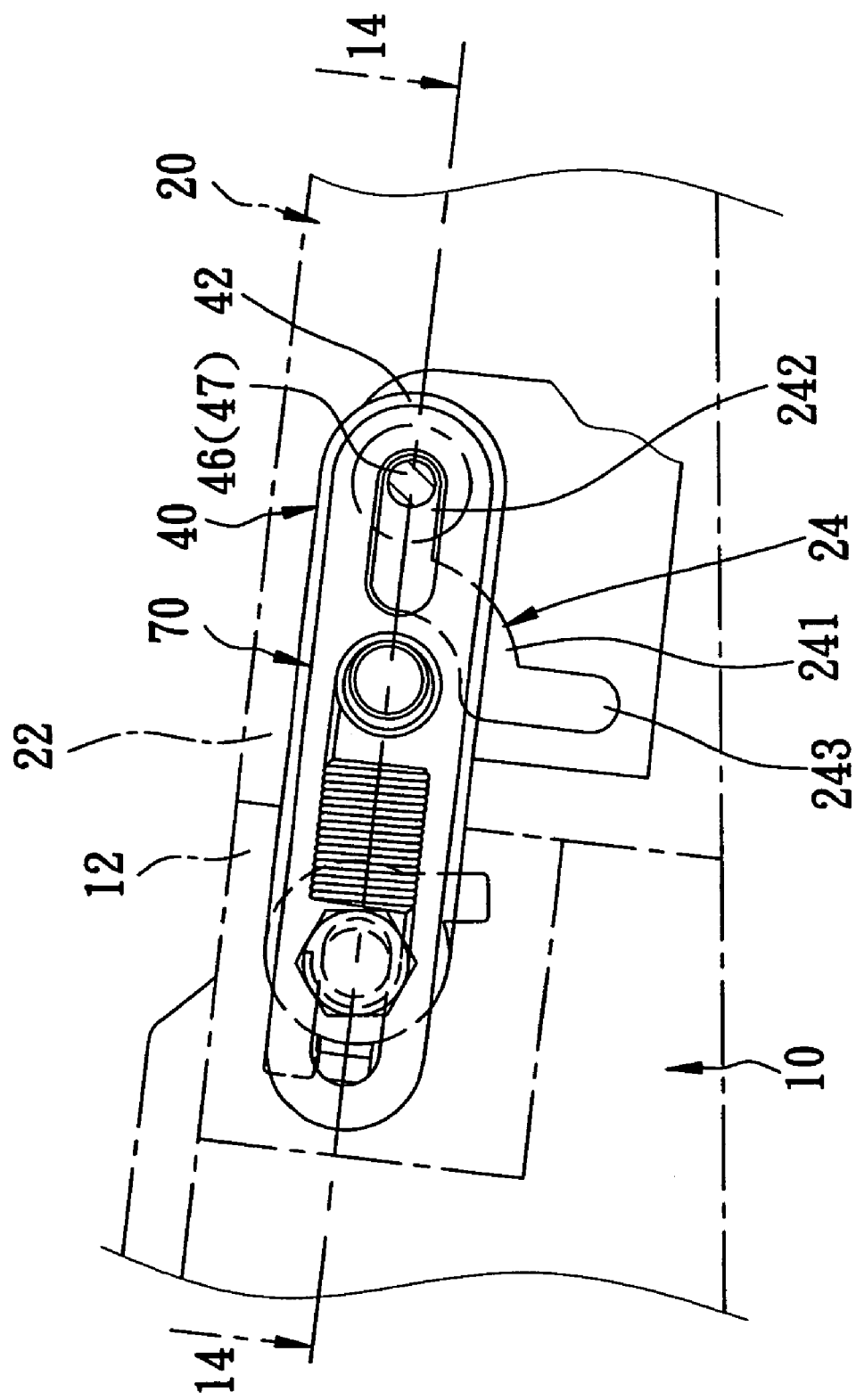
FIG. 13 is an enlarged schematic side view to illustrate a coupling unit of the second preferred embodiment.
Figure 14:
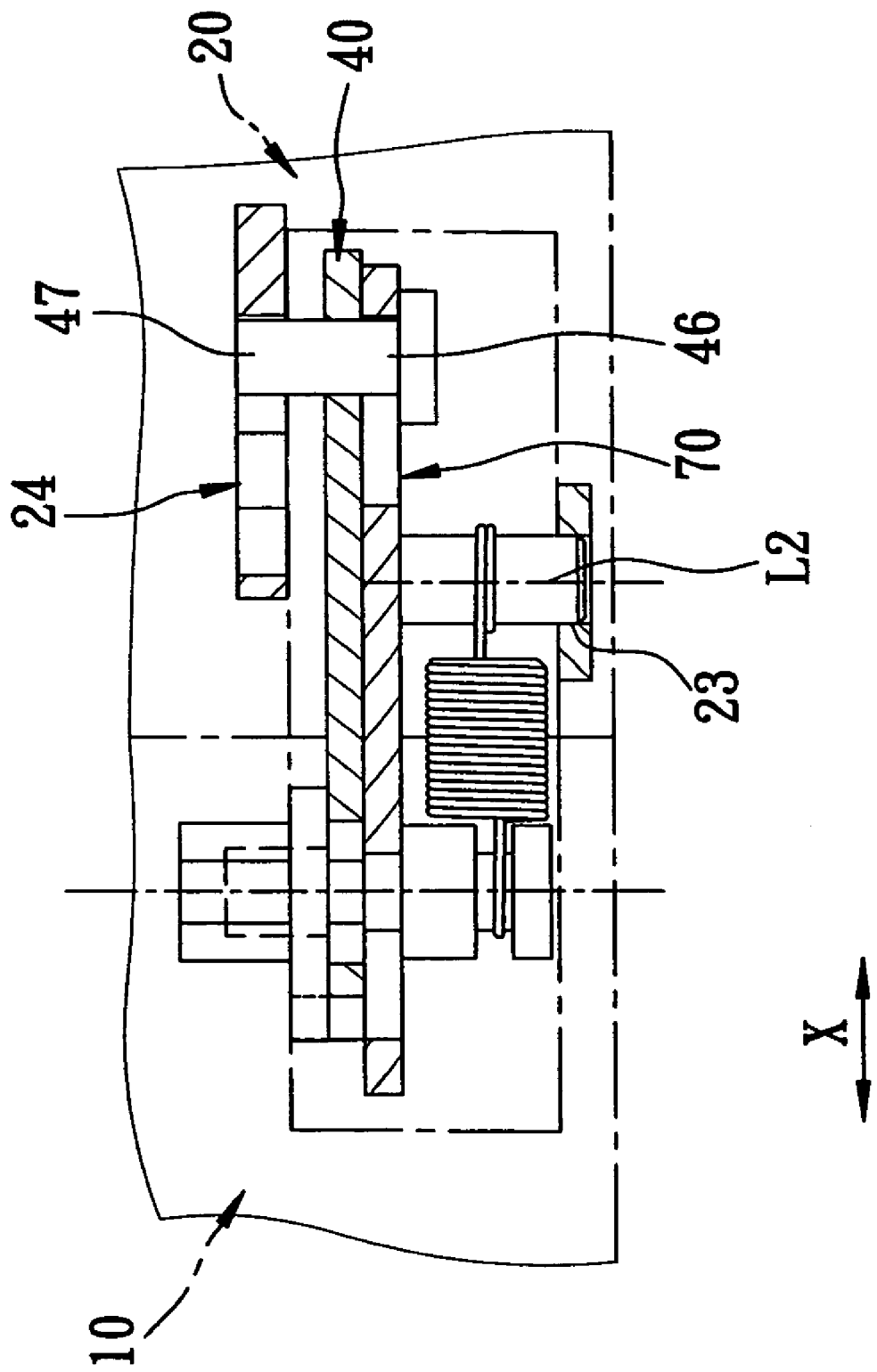
FIG. 14 is a cross-sectional view of the second preferred embodiment, taken along line 14—14 of FIG. 13.

FIGS. 12 to 14 illustrate the second preferred embodiment of the foldable electronic device according to this invention. The foldable electronic device of this embodiment differs from the previous embodiment in that the second member 20 further has a limiting portion 24' opposite to the second positioning portion 23 and formed with a guiding slot 24 that has an arcuate segment 241 having two opposite ends, and first and second segments 242, 243 extending from the ends of the arcuate segment 241, and that the second end portion 42 of the coupling link 40 is further formed with a guiding pin 47 that extends into the guiding slot 24 so as to guiding rotation of the second member 20 relative to the first member 10. The first and second segments 242, 243 form an angle of about 90 degrees. The guiding pin 47 and the slide coupler 46 are opposite to each other in a direction parallel to the second axis L2 and are coaxially disposed.

The first and second members 10, 20 abut against each other, and the guiding pin 47 is disposed in the first segment 242 of the guiding slot 24 (see FIGS. 13 and 14) when the second member 20 is disposed at the unfolded position.

Figure 15:
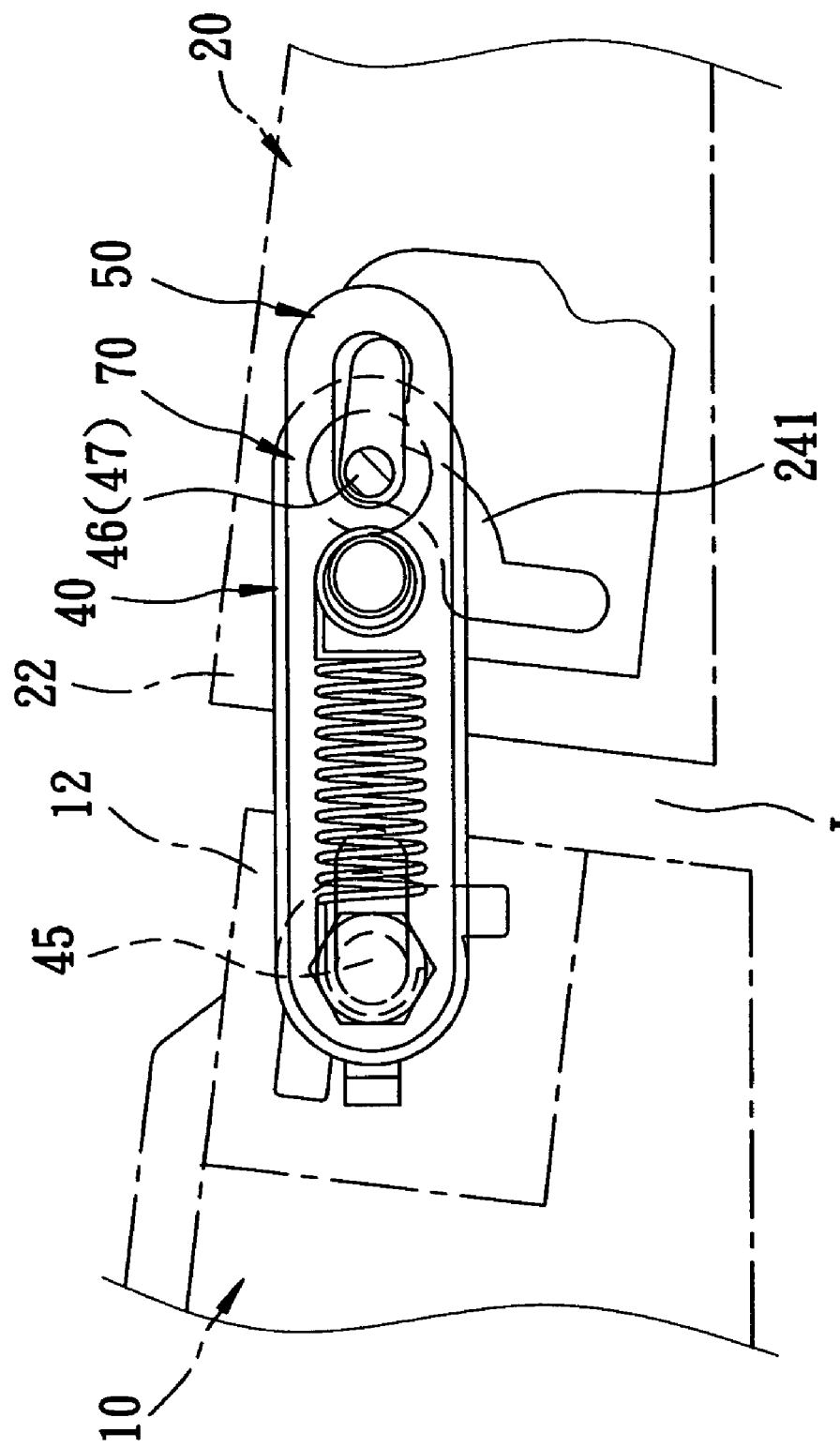
FIGS. 15 to 19 are enlarged schematic side views of the coupling unit of the second preferred embodiment, illustrating movement of the second member from the unfolded position to the folded position relative to the first member.

Referring to FIG. 15, movement of the second member 20 in a direction away from-the first member 10 from the unfolded position to the first intermediate position against the urging action of the biasing member 60 results in simultaneous movement of the slide link 50 relative to the first diameter-reduced part 45 and the slide coupler 46 along the longitudinal direction X, and movement of the guiding slot 24 relative to the guiding pin 47 such that the guiding pin 47 is disposed at one of the ends of the arcuate segment 241 of the guiding slot 24.

Figure 16:
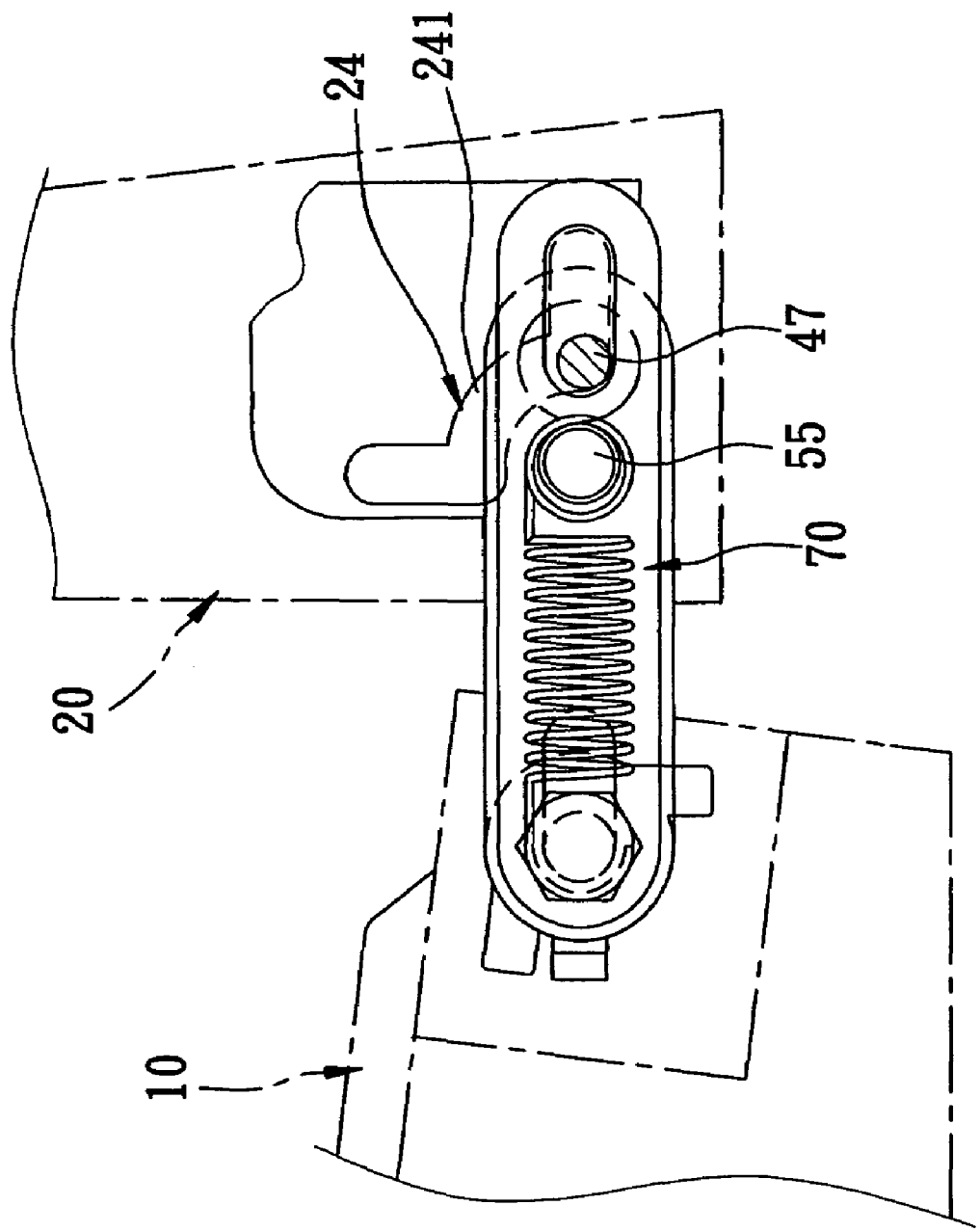
Figure 17:
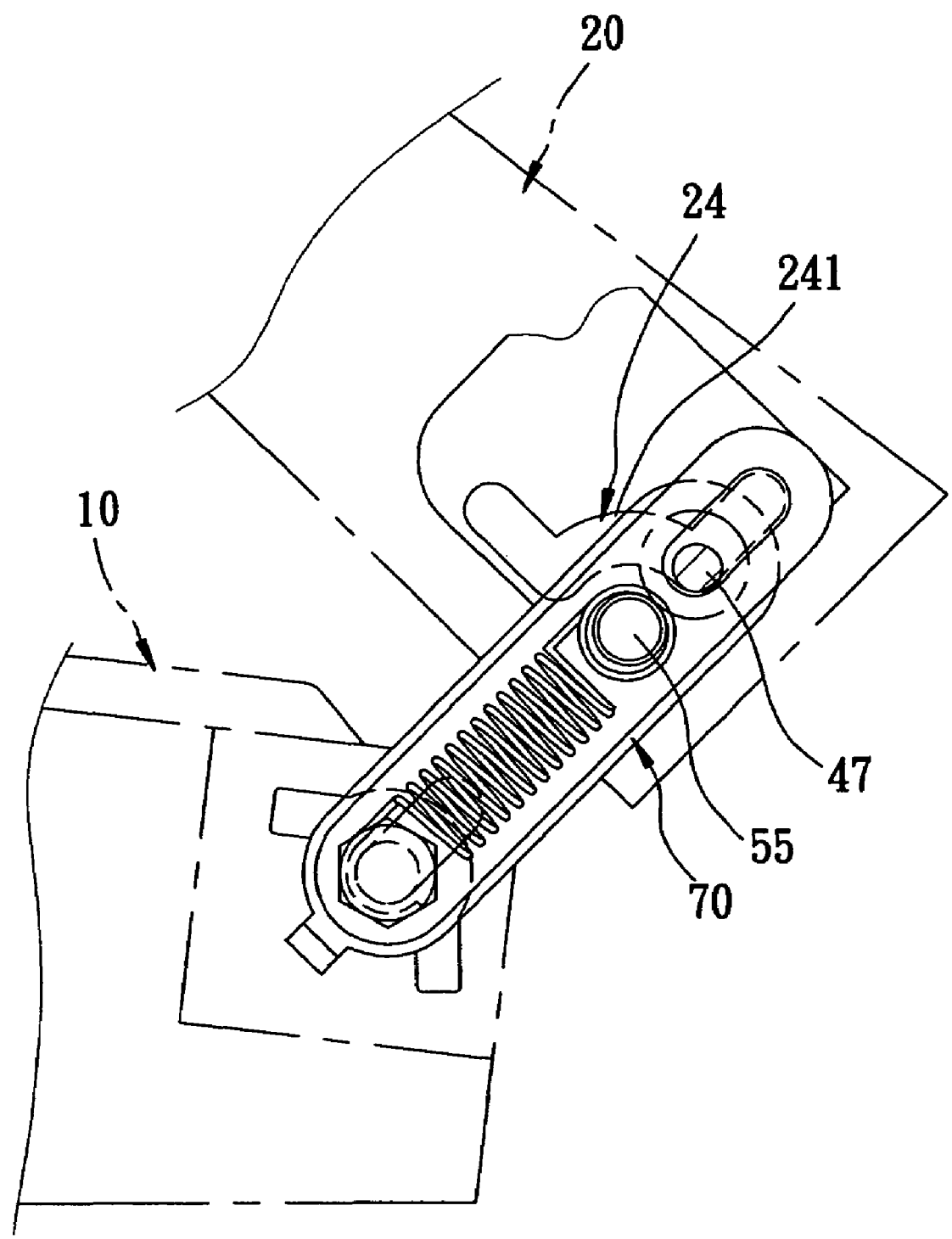

Referring to FIGS. 16 and 17, the second member 20 is rotated about the second axis L2 from the first intermediate position to a position where the guiding pin 47 is disposed at the other of the ends of the arcuate segment 241 of the guiding slot 24.

Figure 18:
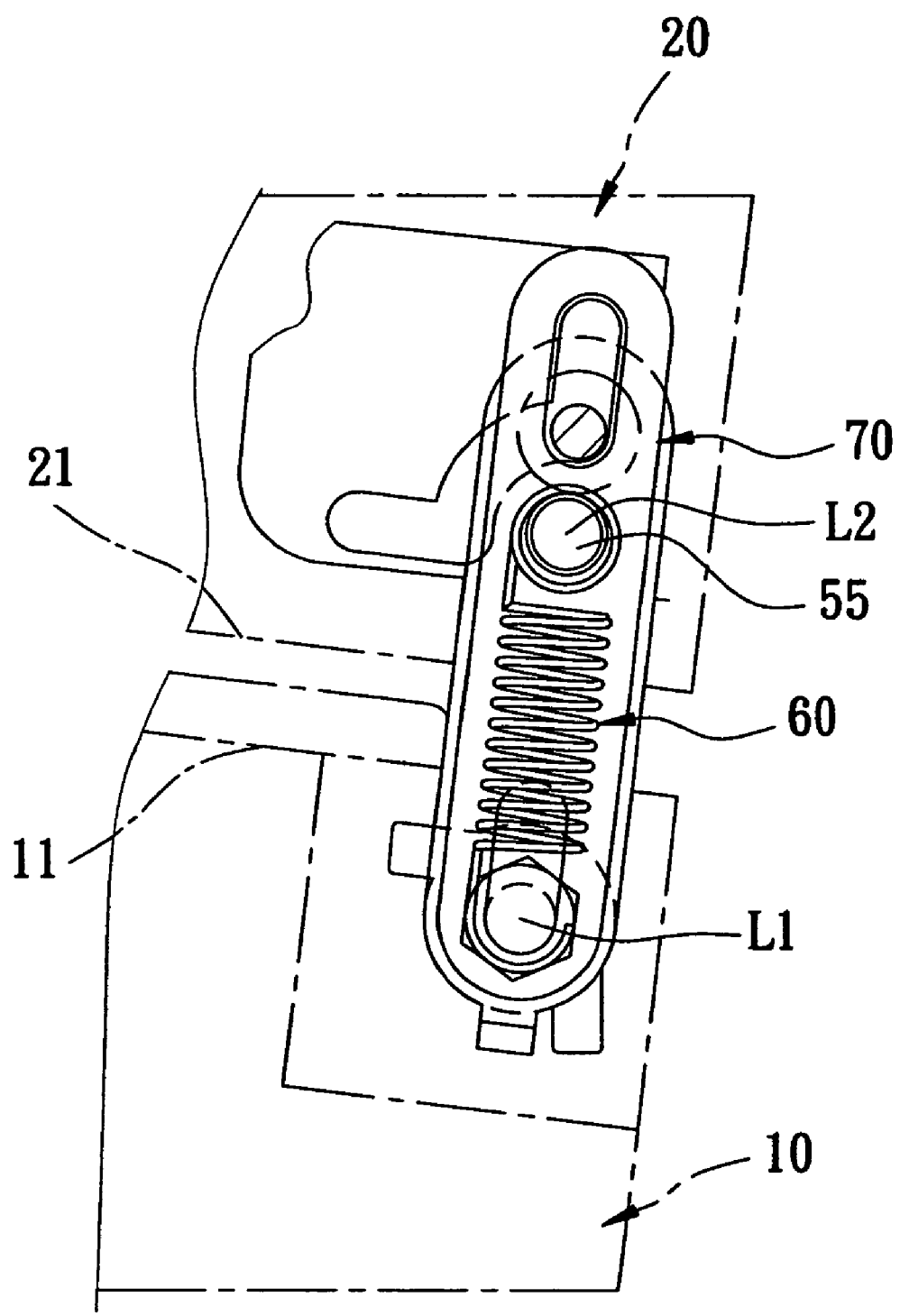
Figure 19:
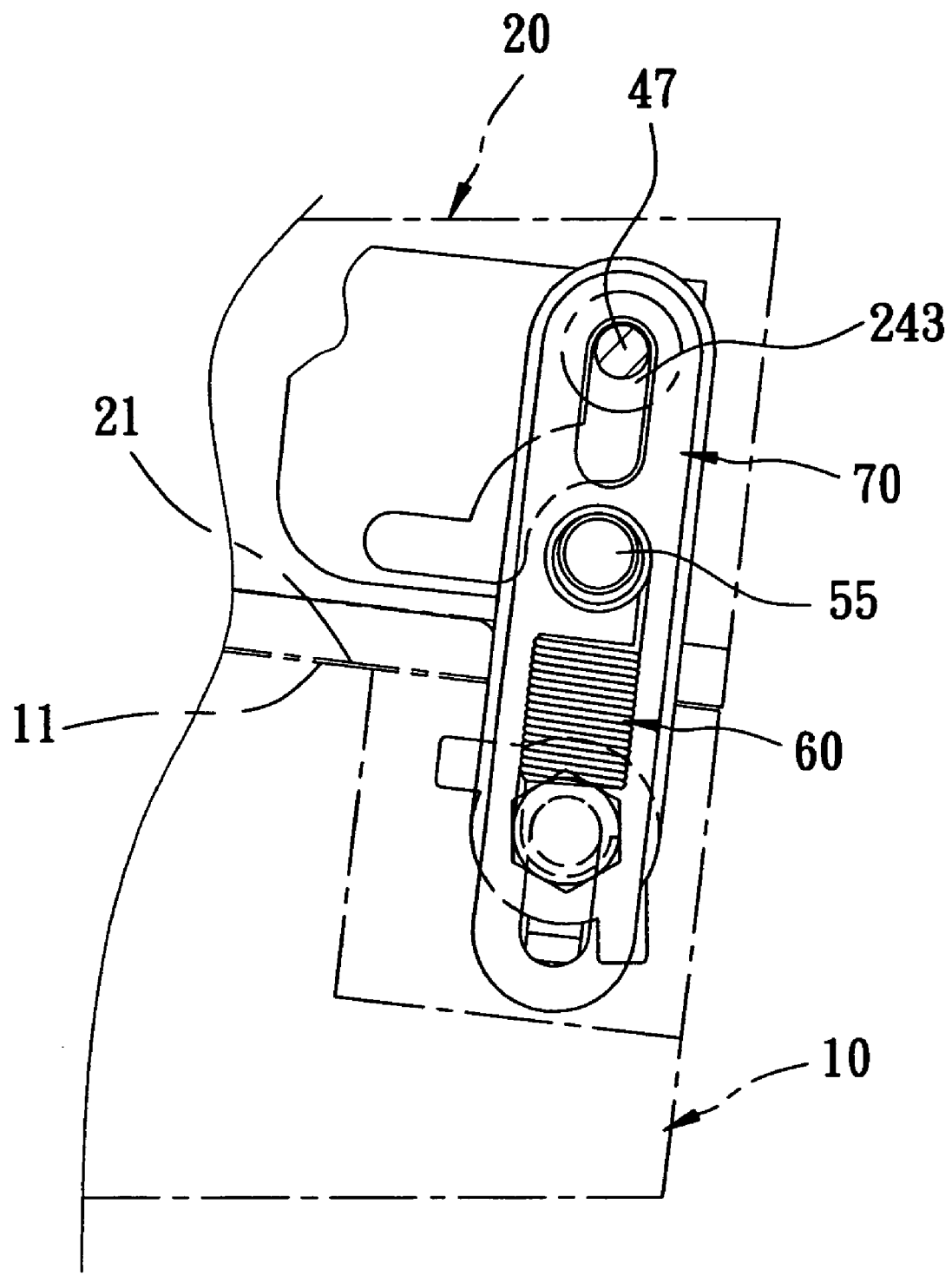

Referring to FIG. 18, the second member 20 is further rotated about the first and second axes L1, L2 from the position shown in FIGS. 16 and 17 to the folded position. The first and second members 10, 20 are restored to an abutting condition (see FIG. 19), in which the two abut against each other, by the urging action of the biasing member 60.

Movement of the second member 20 relative to the first member 10 can be smoothly guided by virtue of the guiding slot 24. Moreover, the shape of the guiding slot 24 can increase the operating sense of the user.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A foldable electronic device comprising:
    a first member having a first top side with an edge portion, and a first positioning portion that extends along a first axis and that is disposed at said edge portion of said first top side;
    a second member having a second top side with an edge portion, and a second positioning portion that extends along a second axis parallel to the first axis and that is disposed at said edge portion of said second top side; and
    a coupling unit for interconnecting pivotally said first and second members, said coupling unit including
        a coupling link having a first end portion retained rotatably at said first positioning portion, and a second end portion opposite to said first end portion in a longitudinal direction transverse to the first and second axes,
        a slide link extending along the longitudinal direction, disposed beside said coupling link, retained slidably on said coupling link for sliding along the longitudinal direction, and retained rotatably at said second positioning portion, and
        a biasing member for pulling said slide link toward said first member;
    said coupling unit permitting movement of said second member in sequence from an unfolded position, a first intermediate position, a second intermediate position, and to a folded position relative to said first member;
    said first and second top sides of said first and second members facing upwardly when said second member is in the unfolded position;
    said second member being operable to pull said slide link away from said first member against action of said biasing member when moving said second member from the unfolded position to the first intermediate position, where a clearance is formed between said edge portions of said first and second top sides of said first and second members;
    said second member being further operable to cause said coupling link to pivot about the first axis when moving said second member from the first intermediate position to the second intermediate position;
    said second member being further operable to cause said slide link to pivot about the second axis when moving said second member from the second intermediate position to the folded position, where said first and second top sides of said first and second members face each other.

2. The foldable electronic device as claimed in claim 1, further comprising a connecting unit for connecting rotatably said coupling link to said first member, said connecting unit including:
    an anchor member mounted non-rotatably to said first positioning portion;
    a limit member fixed on said anchor member, disposed proximate to said coupling link, and formed with radial outward first and second stop projections that are angularly spaced apart from each other; and a pivot member that extends along the first axis and that is connected rotatably to said anchor member;

said first end portion of said coupling link being connected co-rotatably to said pivot member and being formed with a limit block, said limit block being disposed proximate to said first stop projection when said second member is in one of the unfolded and first intermediate positions, said limit block being disposed proximate to said second stop projection when said second member is in one of the second intermediate and folded positions.

3. The foldable electronic device as claimed in claim 2, wherein said first and second stop projections form an angle not greater than 100 degrees therebetween.

4. The foldable electronic device as claimed in claim 2, wherein said pivot member includes an axle segment connected rotatably to said anchor member, a non-circular coupling segment connected to said axle segment, and a cylindrical segment extending from said coupling segment, said first end portion of said coupling link being formed with an engaging hole for engaging non-rotatably said coupling segment.

5. The foldable electronic device as claimed in claim 4, wherein said slide link has a first link portion formed with an elongate first slot, and said cylindrical segment has a first diameter-reduced part adjacent to said coupling segment and movably disposed in said first slot.

6. The foldable electronic device as claimed in claim 5, wherein said slide link further has a second link portion opposite to said first link portion in the longitudinal direction and formed with an elongate second slot, said second end portion of said coupling link being formed with a slide coupler movably disposed in said second slot.

7. The foldable electronic device as claimed in claim 6, wherein said second member further has a limiting portion opposite to said second positioning portion and formed with a guiding slot that has an arcuate segment having two opposite ends, and first and second segments extending from said ends of said arcuate segment, said second end portion of said coupling link being formed with a guiding pin that extends into said guiding slot so as to guiding rotation of said second member relative to said first member.

8. The foldable electronic device as claimed in claim 5, wherein said cylindrical segment further has a second diameter-reduced part, and said slide link is formed with a pivot shaft that engages rotatably said second positioning portion, said biasing member having opposite ends connected respectively to said second diameter-reduced part and said pivot shaft.

9. The foldable electronic device as claimed in claim 8, wherein said biasing member is an extension spring.

10. The foldable electronic device as claimed in claim 1, wherein said biasing member is an extension spring.

11. The foldable electronic device as claimed in claim 1, wherein said second member further has a limiting portion opposite to said second positioning portion and formed with a guiding slot that has an arcuate segment having two opposite ends, and first and second segments extending from said ends of said arcuate segment, said second end portion of said coupling link being formed with a guiding pin that extends into said guiding slot so as to guiding rotation of said second member relative to said first member.

12. The foldable electronic device as claimed in claim 11, wherein said guiding pin and said slide coupler are opposite to each other in a direction parallel to said second axis and are coaxially disposed.

\* \* \* \* \*